(12) United States Patent
Bengtsson

(10) Patent No.: US 7,470,099 B2
(45) Date of Patent: Dec. 30, 2008

(54) SYSTEM FOR LOADING AND UNLOADING LOOSE CARGO IN A CARGO HOLD, PREFERABLY OF A PLANE

(75) Inventor: Hans Bengtsson, Eslöv (SE)

(73) Assignee: Telair International AB, Lund (SE)

( * ) Notice: Subject to any disclaimer, the term of this patent is extended or adjusted under 35 U.S.C. 154(b) by 0 days.

(21) Appl. No.: 10/574,474

(22) PCT Filed: Oct. 1, 2004

(86) PCT No.: PCT/EP2004/011000

§ 371 (c)(1),
(2), (4) Date: Apr. 19, 2007

(87) PCT Pub. No.: WO2005/032940

PCT Pub. Date: Apr. 14, 2005

(65) Prior Publication Data

US 2007/0269298 A1 Nov. 22, 2007

(30) Foreign Application Priority Data

Oct. 2, 2003 (DE) .................................. 103 45 998

(51) Int. Cl.
*B60P 1/00* (2006.01)
*B65G 43/08* (2006.01)
(52) U.S. Cl. ........................................ 414/346; 414/398
(58) Field of Classification Search ............... 198/861.5, 198/397.6, 406, 407, 539, 592, 600, 633, 198/861.1; 414/346, 398, 495; 244/137.1
See application file for complete search history.

(56) References Cited

U.S. PATENT DOCUMENTS

| | | | | |
|---|---|---|---|---|
| 4,124,128 A * | 11/1978 | Adams et al. | ............ | 414/788.3 |
| 5,584,376 A * | 12/1996 | Voldby | ........................ | 198/812 |
| 5,796,052 A | 8/1998 | Christmann | | |
| 6,220,590 B1 * | 4/2001 | Bates et al. | ................. | 271/3.01 |
| 2004/0033126 A1 * | 2/2004 | Thogersen | ................... | 414/398 |
| 2006/0133913 A1 * | 6/2006 | Helmner | ..................... | 414/373 |

FOREIGN PATENT DOCUMENTS

WO   WO 03/076267   9/2003

* cited by examiner

*Primary Examiner*—Charles A Fox
(74) *Attorney, Agent, or Firm*—Baker & Hostetler LLP

(57) ABSTRACT

The present invention for the first time proposes a system for loading and unloading loose cargo in a cargo hold, preferably of a plane. The system comprises a conveyor apparatus for transporting the loose cargo between a tarmac level or the like and a cargo hold opening, wherein the conveyor apparatus comprises a transport organ on whose transport side the loose cargo lies during loading and unloading. Moreover the system comprises an intermediate conveyor means which rests on the transport side of the conveyor apparatus in the range of a cargo hold-side end thereof and extends into the cargo hold for conveying loose cargo lying on a conveying side of the intermediate conveyor means between the conveyor apparatus and the cargo hold. The transport organ is to be deflected, in front of the placed-on intermediate conveyor means when viewed in the direction of loading-conveying, perpendicular to the plane of transport in a direction towards the conveying side of the intermediate conveyor means, so as to guide the loose cargo onto the conveying side of the intermediate conveyor means.

14 Claims, 4 Drawing Sheets

SYSTEM FOR LOADING AND UNLOADING LOOSE CARGO IN A CARGO HOLD, PREFERABLY OF A PLANE

CROSS-REFERENCE TO RELATED APPLICATIONS

This application is a National Stage of Patent Cooperation Treaty (PCT) Application No. PCT/EP2004/011000, filed on Oct. 1, 2004, which claims priority to German Patent Application No. DE 103 45 998.7, filed on Oct. 2, 2003, the disclosure of both applications are incorporated herein by reference in their entirety.

FIELD OF THE INVENTION

The present invention concerns a system for loading and unloading loose cargo in a cargo hold, preferably of a plane, which comprises a conveyor apparatus for transporting the loose cargo between a tarmac level or the like and a cargo hold opening, wherein the conveyor apparatus comprises a transport organ on whose transport side the loose cargo lies during loading and unloading, as well as an intermediate conveyor means which rests on the transport side of the conveyor apparatus in the range of a cargo hold-side end thereof and extends into the cargo hold for conveying loose cargo lying on a conveying side of the intermediate conveyor means between the conveyor apparatus and the cargo hold.

BACKGROUND OF THE INVENTION

Such a system is known from WO 03/076267 A1 to the same applicant. This system, which is described by the example of a plane, includes an external conveyor apparatus which as a rule comprises a mobile handling machine. The conveyor apparatus further traditionally includes a conveyor belt or several consecutive conveyor belts which are arranged on the handling machine and serve as a transport organ for loose cargo such as boxes, suitcases, bags, etc. This transport organ is supplied in the range of the tarmac level with the loose cargo which is then conveyed during loading to a cargo hold opening of the plane. To this end, the mobile handling machine is positioned such that the transport organ reaches as far as into the range of the cargo hold opening without, however, protruding into the latter, so as to avoid damage to the fuselage. For adaptation to various types of planes, the transport organ is moreover adjustable at least in its inclination.

In this known loading system, an intermediate conveyor means is furthermore placed on the external conveyor apparatus and reaches into the cargo hold of the plane. This intermediate conveyor means may be attached in the plane or at the external conveyor apparatus. By means of this intermediate conveyor means the loose cargo may be conveyed into the cargo hold and taken to a desired position there, so that fully automated or at least semi-automated conveying—which generally only requires no more than a single person—is possible. Thanks to this known system, planes may be loaded and unloaded within a very short time. In addition, however, this system may also be employed in other applications such as in loading railroad freight cars, containers, or the like.

Despite the many advantages of this known system, particularly with a view to the reduced time required for the loading and unloading process, as well as the reduced number of required personnel, it was nevertheless found that it is susceptible to improvement: Thus it may sometimes happen in particular with loose cargo having sharp edges or corners, such as chests or boxes, that these get caught on the side of the intermediate conveyor means facing the conveyor apparatus and cannot get onto the conveying side of the intermediate conveyor means without additional manual intervention. The cause of this problem is inherent in the system insofar as the intermediate conveyor means is placed on the transport side of the conveyor apparatus and, as it naturally has to have a certain height, a corresponding difference in height has to be overcome. Conventional hard suitcases, travelling bags, etc. are provided with edges that are usually sufficiently rounded so as to readily overcome this "step." In the case of loose cargo having distinct edges, however, this is not always true. This initially has the result of a transport backup, whereby the advantages with regard to the reduced time required during loading of the cargo hold are diminished, and which must frequently be eliminated manually. In addition such a transport backup implies the risk of single pieces of loose cargo possibly being pushed laterally off the transport organ by following objects, so that they may fall off and thus be damaged. Moreover this may also lead to a risk for persons present in this area.

SUMMARY FO THE INVENTION

The invention is therefore based on the object of further developing a generic system for loading and unloading a cargo hold with loose cargo in such a way that loose cargo having distinct edges may also reliably reach the conveying side of the intermediate conveyor means.

This object is achieved by a system having the features of claim 1. It is in particular characterized by the fact that the transport organ is deflected, in front of the placed-on intermediate conveyor means when viewed in the direction of loading-conveying, perpendicular to the plane of transport in a direction towards the conveying side of the intermediate conveyor means, so as to guide the loose cargo onto the conveying side of the intermediate conveyor means.

Thus it is provided for the first time in accordance with the invention to establish a kind of transition between the transport side of the conveyor apparatus and the conveying side of the intermediate conveyor means, so that the loose cargo does not directly impact on the guide roller of the intermediate conveyor means adjacent the conveyor apparatus, but is guided beyond it. It was found in practical experimentation that for this purpose it is only necessary to deflect the transport organ of the conveyor apparatus from the plane of transport, which is defined per se by the transport side, in a direction towards the conveying side of the intermediate conveyor means. The loose cargo is thus already subjected to a first change of direction while on the conveyor apparatus. It thus reaches the upper side of the intermediate conveyor means even more reliably than in the prior art. The loose cargo may thus reliably be avoided from impacting on the end face of the intermediate conveyor means facing the conveyor apparatus.

Moreover the local deflection of the transport organ in the range in front of the intermediate conveyor means as provided in accordance with the invention also supports the unloading process within the system, for loose cargo taken out from the cargo hold does not have to overcome a distinct step but is transmitted in an essentially continuous movement from the intermediate conveyor means to the conveyor apparatus. This continuous movement as a rule already results from the fact that the loose cargo mostly possesses a corresponding length which is substantially greater than the distance between the point of maximum deflection of the transport organ and the beginning of the conveying side of the intermediate conveyor means. This effect is moreover useful in order to allow smooth loading by means of the system of the invention. As the corresponding parameters are known, the system in accordance with the invention may readily be adapted.

As a result, in accordance with the invention a transport backup of the loose cargo may reliably be avoided inside the loading and unloading system. Moreover the risk of pieces of luggage or the like falling off from the conveyor apparatus is hereby clearly reduced, so that damages to the loose cargo on the one hand and risks to persons present in this range on the other hand may reliably be avoided. In particular, a very rapid and reliable loading and unloading process may be achieved in accordance with the invention. This is of particular importance in air traffic, for here the ground times of a plane at the airport should be kept as low as possible for reasons of cost.

Advantageous developments of the system in accordance with the invention are subject matter of the dependent claims.

Thus the transport organ may include a conveyor belt whose respective section present on the transport side is deflected with the aid of a raising means. In this case a conventional conveyor belt may be utilized and adapted, in accordance with the invention, by the mere arrangement of a corresponding raising means. The constructive complexity involved in equipping a system in accordance with the invention or retrofitting a conventional system into a loading and unloading system in accordance with the invention is therefore very low.

The raising means may be a bow which extends underneath the associated section of the conveyor belt. Hereby an arrangement may be achieved which is kept particularly simple in terms of construction, yet very reliable and stable. The reliability and functionality of the system in accordance with the invention is hereby enhanced further.

It is of further advantage if the bow is realized to have a curvature in the transverse direction relative to the conveying direction of the conveyor belt, such that a portion of the bow present in a center position at the conveyor belt is spaced farther apart from the intermediate conveyor means than the lateral portions thereof. By this design it is avoided that the loose cargo simultaneously impacts over its entire width on the protruding area. The transition in this location may thus be designed to be less distinct. Moreover the frictional strain in this range is thus also reduced, for the loose cargo is gradually guided onto the raised range. Hereby it may be achieved that the conveying flow altogether is more homogeneous. Moreover the curved configuration of the bow favors a guiding or orienting, respectively, of the loose cargo onto the subsequent intermediate conveyor means.

In an alternative design, the raising means may be a roller which extends underneath the associated section of the conveyor belt. In comparison with a bow, such a roller has the advantage that the friction relative to the conveyor belt is reduced, so that the latter may be driven at a lower energy expenditure and moreover is loaded less with regard to possible damages.

It is furthermore advantageous if the intermediate conveyor means is placed on the transport organ by means of a roller means. In this case, the reversal of the deflection of the transport organ which takes place in this range may also take place in a rolling manner, so that friction losses in this location may be kept low.

Due to the fact that the intermediate conveyor means is placed on the conveyor apparatus so as to be displaceable in the conveying direction together with the raising means, a reliable and unproblematic variation of the depth of penetration of the intermediate conveyor means into the cargo hold is moreover possible without the local deflection of the transport organ in the range in front of the intermediate conveyor means, as provided in accordance with the invention, being lost. The effect in accordance with the invention of the improved handover of loose cargo from the conveyor apparatus to the intermediate conveyor means may thus also be utilized reliably and continuously, or without expenditure for retrofitting, at varying loading depths.

BRIEF DESCRIPTION OF THE DRAWINGS

The system in accordance with the invention shall in the following be explained in more detail in practical examples by referring to the figures, wherein.

DETAILED DESCRIPTION OF THE INVENTION

Figure 1:
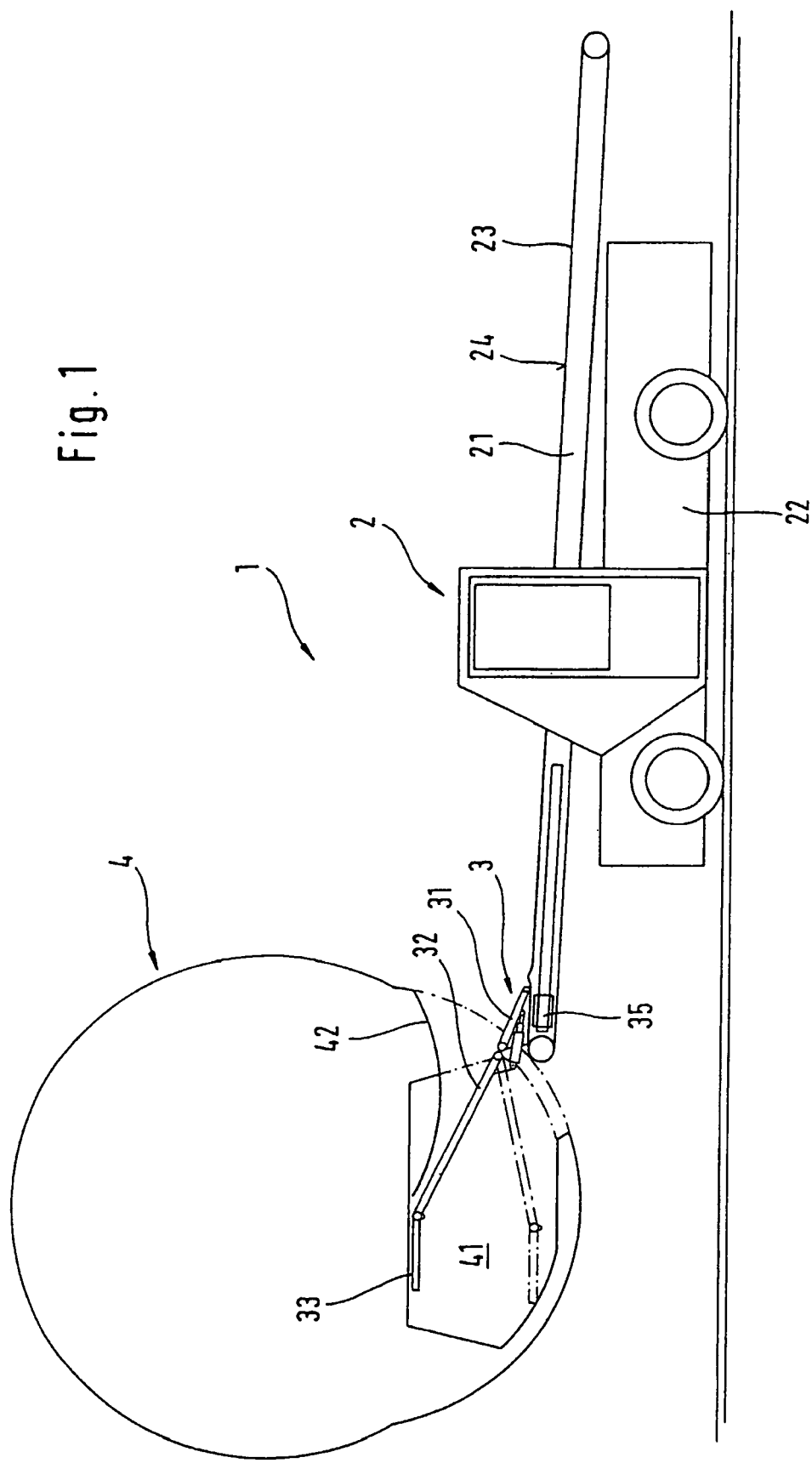
FIG. 1 is a schematic lateral view of the loading and unloading system in accordance with the invention by the example of a plane.

In accordance with the representation in FIG. 1, a system 1 for loading and unloading a cargo hold comprises a conveyor apparatus 2 as well as an intermediate conveyor means 3, whereby loose cargo (not shown) may be loaded into a plane 4 or unloaded from the latter.

To this end, the conveyor apparatus 2 includes a transport organ 21 arranged on a mobile handling machine 22. The transport organ 21 comprises a conveyor belt 23 which is deviated via end-side rollers, and the respective upwardly facing side of which serves as the transport side 24 for the loose cargo.

The intermediate conveyor means 3 includes a first conveyor module 31, a second conveyor module 32, and a third conveyor module 33, which articulatedly coupled to each other such as to be adapted to introduce loose cargo in a freely selectable height into a cargo hold 41 of the plane 4 or remove it therefrom. In FIG. 1 the intermediate conveyor means 3 is shown in its upper position, wherein a lower position of the conveyor modules 32 and 33 is furthermore indicated in dash-dotted lines. The conveyor modules 31 to 33 are coupled to the conveyor apparatus 2 by means of a mounting 34 which is shown in more detail in FIGS. 3 and 4.

The connection between the conveyor apparatus 2 and the intermediate conveyor means 3 is configured in that the intermediate conveyor means 3 is coupled to the two lateral surfaces of the conveyor apparatus 2 by means of slides 35 arranged on both sides so as to be linearly displaceable. In this way the intermediate conveyor means 3 may be moved further into the cargo hold 41 through an opened cargo hold hatch 42, or out of the latter.

Figure 3:
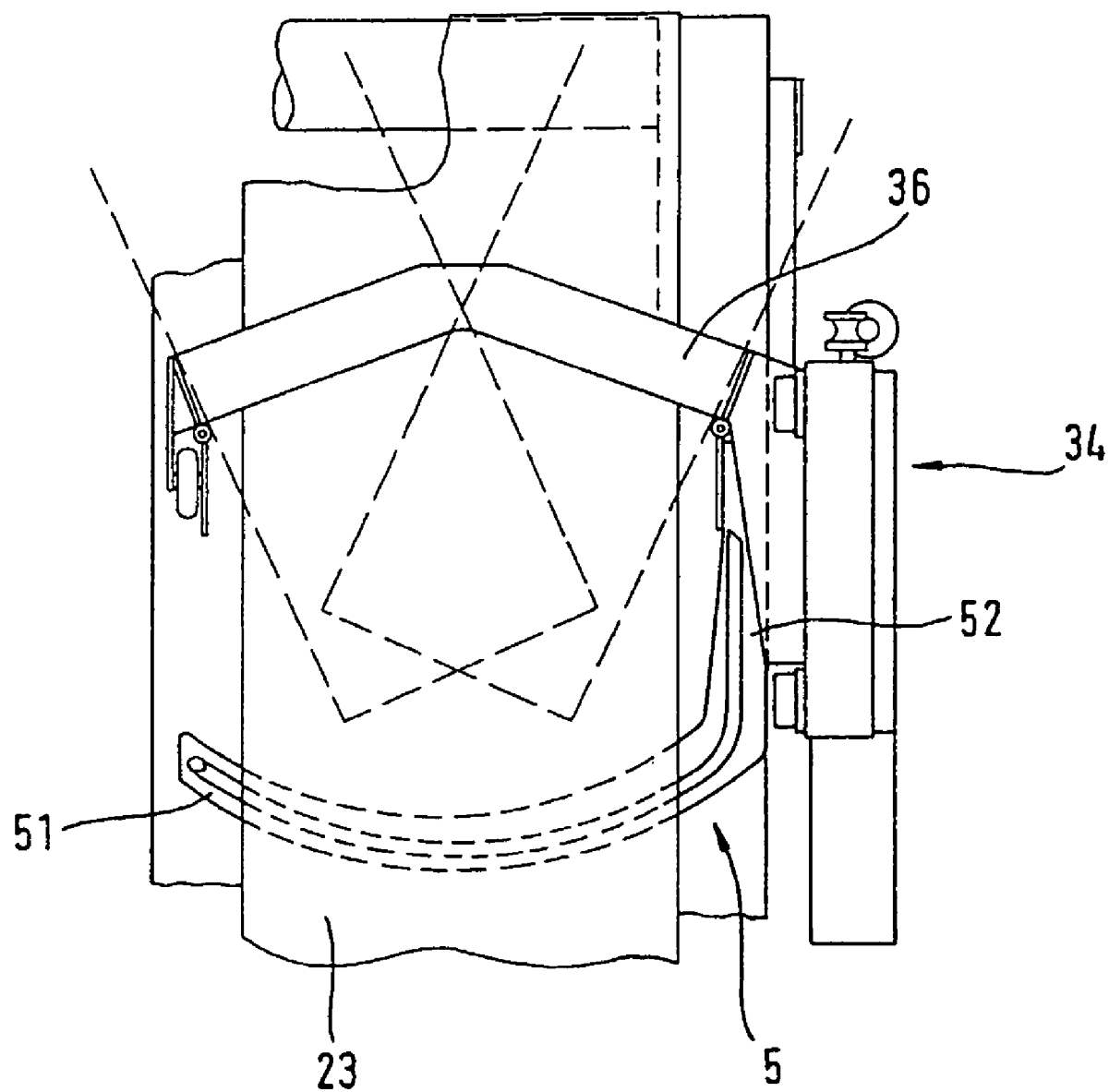
FIG. 3 is a top view of the detail in accordance with FIG. 2, with a bow as the raising means in accordance with a first embodiment.

In FIG. 3 a retaining arm 36 is moreover represented whereby the intermediate conveyor means 3 is fixed to the conveyor apparatus 2. The retaining arm 36 here cooperates with the slides 35 that are present on both sides. Furthermore it is indicated in dashed lines in FIG. 3 that the first conveyor module 31 and thus the entire intermediate conveyor means 3 is retained pivotally at the conveyor apparatus 2. Therefore it is also possible to purposely supply loose cargo to areas of the cargo hold 41 adjacent the cargo hold hatch 42.

For the rest, the construction of the system 1 insofar corresponds to the construction known from WO 03/076267 A1, so that reference is made thereto with regard to further constructive details, the functions, and the effects thereby achievable.

Figure 2:
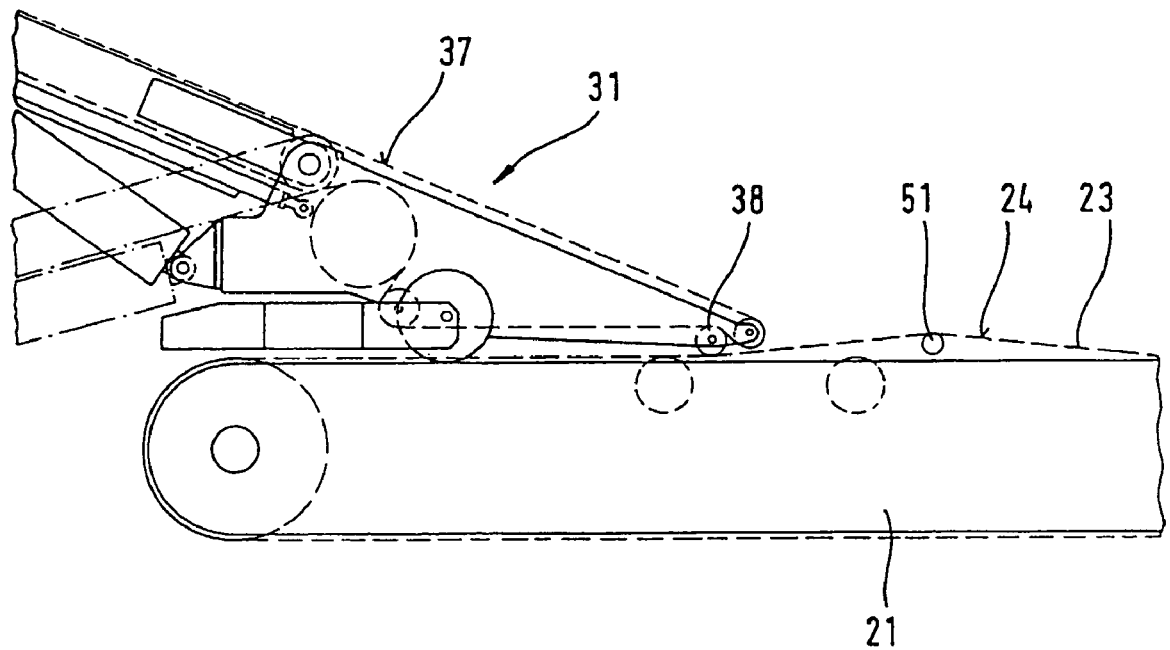
FIG. 2 is a detail representation, also in lateral view, of the transitional range between the conveyor apparatus and the intermediate conveyor means.

As is visible in more detail in FIGS. 2 and 3, the system 1 moreover includes a raising means 5 whereby a local deflection of the respective section of the conveyor belt 23 present on the transport side 24 is established in the area present in the direction of loading-conveying in front of the intermediate conveyor means 3. To this end, the raising means 5 has a bow 51 which is coupled to the conveyor apparatus 2 by means of a retainer 52 so as to be linearly displaceable together with the intermediate conveyor means 3. The bow 51 has a curved configuration in the represented manner when viewed in the transverse direction relative to the conveyor belt 23, so that a portion of the bow 51 present on the conveyor belt 23 in a center position is spaced farther away from the first conveyor module 31 of the intermediate conveyor means 3 than the lateral portions thereof.

As is clearly visible particularly in FIG. 2, the bow 51 results in a the section of the conveyor belt 23 present on the transport side 26 being raised, so that loose cargo arriving here does not impact directly on the front end of the first conveyor module 31, but is directed to a conveying side 37 thereof. This deflection is again reversed on the one hand by the influence of gravity on the conveyor belt 23 and on the other hand with the aid of a roller means 38 which is arranged at the bottom side of the first conveyor module 31 and moreover adjacent the front end of the conveyor module 31. The intermediate conveyor means 3 is rollingly, and thus with low friction, supported on the conveyor apparatus 2 by this roller means 38.

The distance between the front end of the conveyor module 31 and the bow 51 will in practice be selected in dependence on the respective case of application. Here it was found to be suitable to not make this distance too small so as not to subject the material of the conveyor belt 23 to excessive strain owing to the bending stresses occurring in the process, and on the other hand nevertheless to choose the distance so small that even loose cargo having smaller dimensions than the usual ones, such as small-sized suitcases, still have a sufficiently great longitudinal extension in relation to this distance so that they are reliably guided through the existing local deflection to the conveying side 37 of the first conveyor module 31 without getting caught at the front edge thereof.

Figure 4:
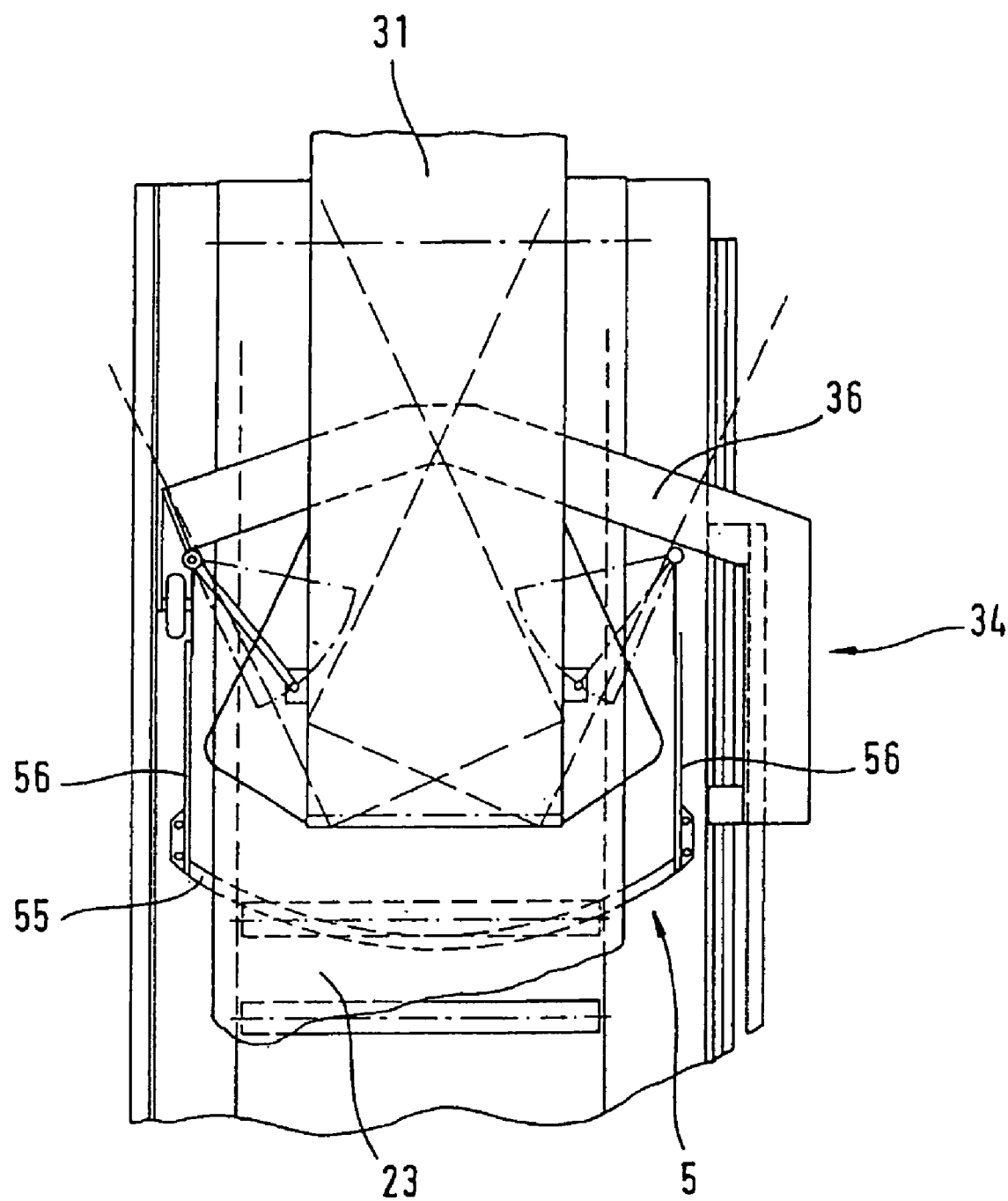
FIG. 4 is a view similar to FIG. 3 with a bow in a second embodiment.

FIG. 4 shows a modified embodiment in which a bow 55 is coupled to the intermediate conveyor means 3 by a respective retainer 56 on either side.

The design shown in FIG. 3 is in particular suited for retrofitting on conventional conveyor apparatuses 2, for hereby the necessary modifications may be kept within limits, and the intermediate conveyor means 3 may be inserted laterally on the conveyor apparatus 2 essentially with low complexity. The alternative shown in FIG. 4, on the other hand, is of particular advantage for new productions, for here the bow 55 may be positioned in an even more stable manner with the aid of the mounting on both sides, and thus particularly reliable conveying of the loose cargo may be achieved even in the cases of heavy suitcases etc.

The invention allows for further configuring approaches besides the embodiments presently shown.

Thus the bow of the raising means 5 may furthermore be configured in a non-curved shape, i.e., straight. Moreover the bow may be designed to be independently adjustable both in respect of the distance from the front end of the first conveyor module 31 and the degree of deflection. In a preferred manner the bow is formed of a material having good sliding properties. It may, however, also carry rollers, whereby the friction in this location may be reduced.

Moreover it is also possible to provide—instead of the bow—a roller means which may optionally contain several rollers staggered from each other so as to produce a curvature.

The intermediate conveyor means 3 is in the present practical example coupled to the conveyor apparatus 2 by means of the mounting 34, the retaining arm 36, and the lateral slides 35; in a modified embodiment it is, however, also possible for the intermediate conveyor means to be fastened in the cargo hold of the plane etc.

The roller means 38 may be constructed as one roller that is continuous in the transverse direction relative to the conveyor belt 23, or also in the form of several cooperating individual rollers. In an alternative design it is, however, also possible to put a slide member or the like in the place of the roller means 38.

Furthermore it is also possible to provide instead of the conveyor belt 23 a kind of chain of rollers wherein a multiplicity of rollers consecutively arranged in the conveying direction exists. In this case the deflection from the plane of transport may also be brought about by one or several rollers projecting by a predetermined degree in comparison with the other rollers.

Where the degree of deflection of the conveyor belt makes this necessary, a means for length compensation may furthermore be provided on this conveyor belt 23 in order to avoid excessive dilation of the material of the conveyor belt which would imply the risk of damage thereto.

It should moreover be noted that the system 1 in accordance with the invention may also be employed with any other type of cargo hold, i.e., not only with planes, but for example also with containers or railway cars. Furthermore the intermediate conveyor means 3 comprising the raising means 5 coupled to it constitutes a product suited for independent distribution, which may also be retrofitted on conventional conveyor apparatuses 2.

The invention claimed is:

1. A system for loading and unloading loose cargo in a cargo hold of a plane, comprising:
a conveyor apparatus for transporting the loose cargo between a tarmac level and a cargo hold opening, wherein the conveyor apparatus comprises a transport organ on whose transport side the loose cargo lies during loading and unloading; and
an intermediate conveyor means which rests on the transport side of the conveyor apparatus in the range of a cargo hold-side end thereof and extends into the cargo hold for conveying loose cargo lying on a conveying side of the intermediate conveyor means between the conveyor apparatus and the cargo hold, the intermediate conveyor adapted to be placed on the transport organ;
wherein
the transport organ is deflected, in front of the placed-on intermediate conveyor means when viewed in the direction of loading-conveying, perpendicular to the plane of transport in a direction towards the conveying side of the intermediate conveyor means, so as to guide the loose cargo onto the conveying side of the intermediate conveyor means, wherein the transport organ includes a conveyor belt having a section present on the transport side deflected relative to the remainder of the conveyor belt with the aid of a raising means.

2. The system in accordance with claim 1, wherein the raising means is a bow which extends underneath the associated section of the conveyor belt.

3. The system in accordance with claim 2, wherein the bow is realized to have a curvature in the transverse direction relative to the conveying direction of the conveyor belt, such that a portion of the bow present in a center position at the conveyor belt is spaced farther apart from the intermediate conveyor means than the lateral portions thereof.

4. The system in accordance with claim 3, wherein the intermediate conveyor means is placed on the transport organ with the aid of a roller means.

5. The system in accordance with claim 3, wherein the intermediate conveyor means is placed on the conveyor apparatus so as to be displaceable in the conveying direction together with the raising means.

6. The system in accordance with claim 2, wherein the intermediate conveyor means is placed on the transport organ with the aid of a roller means.

7. The system in accordance with claim 2, wherein the intermediate conveyor means is placed on the conveyor apparatus so as to be displaceable in the conveying direction together with the raising means.

8. The system in accordance with claim 1, wherein the raising means is a roller which extends underneath the associated section of the conveyor belt.

9. The system in accordance with claim 8, wherein the intermediate conveyor means is placed on the transport organ with the aid of a roller means.

10. The system in accordance with claim 8, wherein the intermediate conveyor means is placed on the conveyor apparatus so as to be displaceable in the conveying direction together with the raising means.

11. The system in accordance with claim 1, wherein the intermediate conveyor means is placed on the transport organ with the aid of a roller means.

12. The system in accordance with claim 11, wherein the intermediate conveyor means is placed on the conveyor apparatus so as to be displaceable in the conveying direction together with the raising means.

13. The system in accordance with claim 1, wherein the intermediate conveyor means is placed on the conveyor apparatus so as to be displaceable in the conveying direction together with the raising means.

14. The system in accordance with claim 1, wherein the intermediate conveyor means is placed on the transport organ with the aid of a roller means.

* * * * *